July 25, 1939. R. E. C. SCHULZ 2,167,376
VEHICLE BODY
Filed April 10, 1937 4 Sheets-Sheet 1

Inventor:
R. E. C. Schulz
By Glascock Downing & Seebold
Attys.

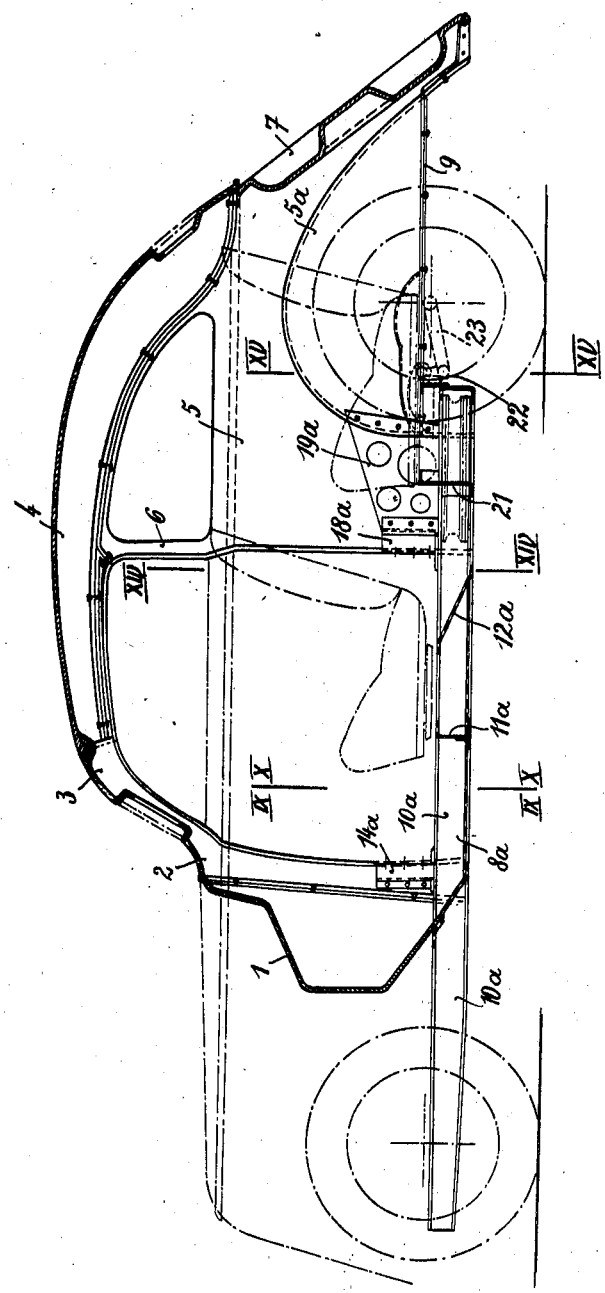

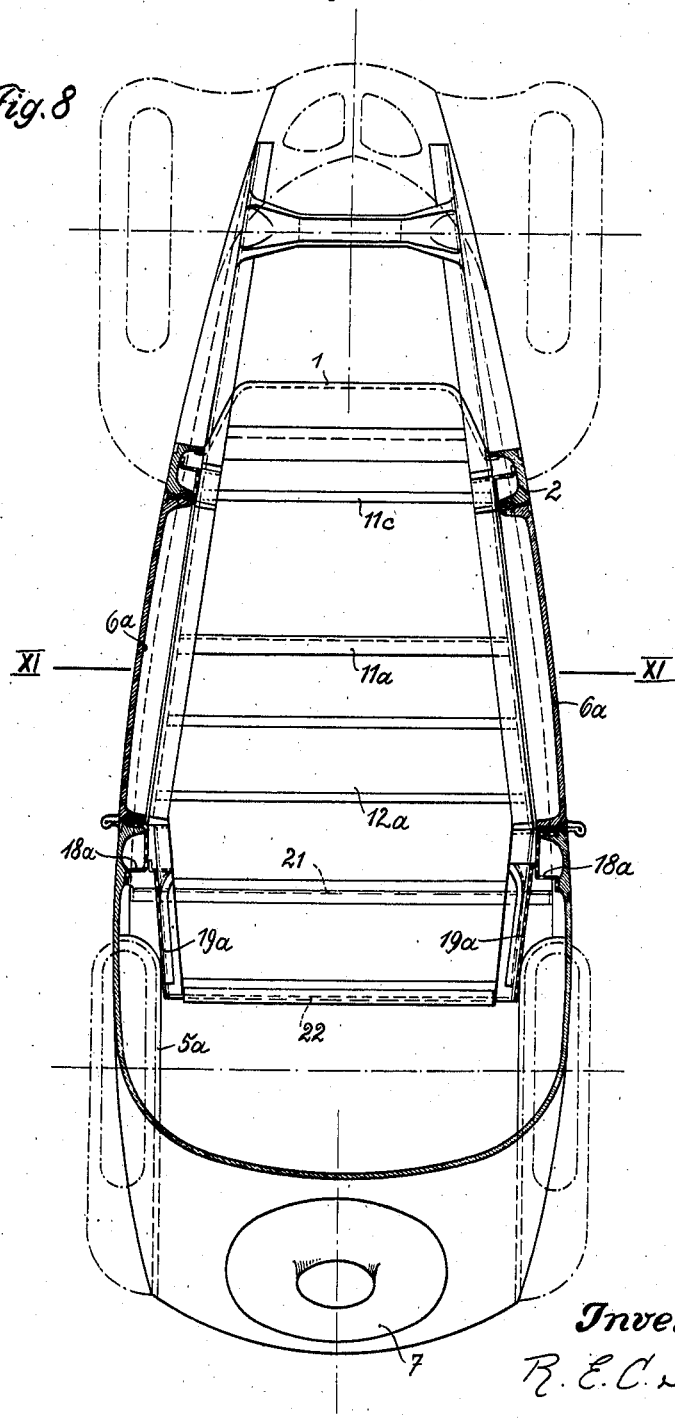

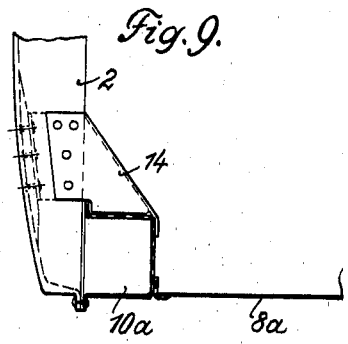
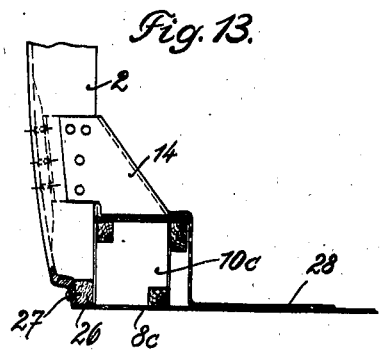
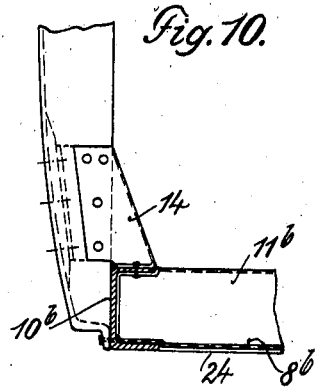
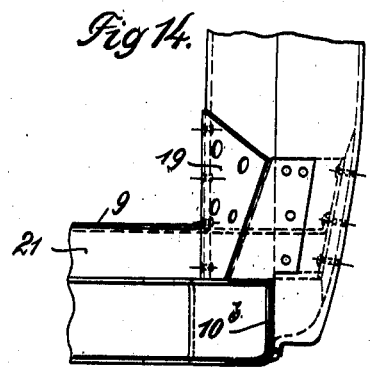
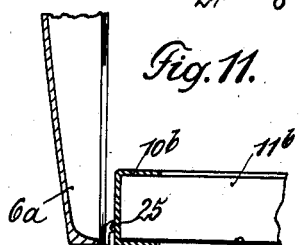
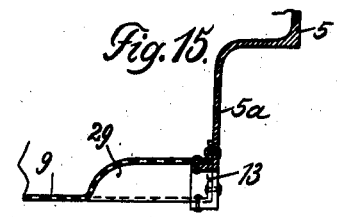
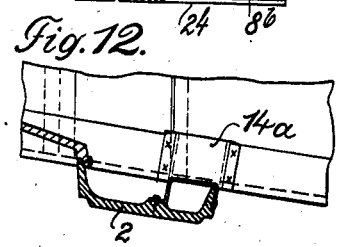
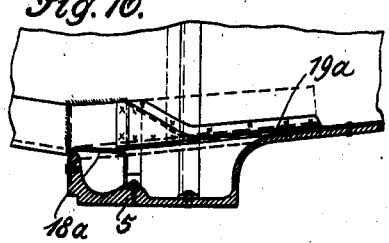

Patented July 25, 1939

2,167,376

UNITED STATES PATENT OFFICE 2,167,376

VEHICLE BODY

Reinhold Erhard Conrad Schulz, Berlin-Spandau, Germany, assignor to Auto Union Aktiengesellschaft, Chemnitz, Germany Application April 10, 1937, Serial No. 136,213
In Germany April 11, 1936

1 Claim. (Cl. 296—31).

In vehicle bodies of pressed artificial resin material, especially for vehicles of large dimensions, a difficulty is met in the manufacture, since the floor, on account of its size, requires large and correspondingly expensive dies and plungers and very powerful presses, the production of which does not appear justified for the manufacture of small numbers.

The invention provides a vehicle body, more particularly for automobiles, using artificial resin or similar susbtance, and the novelty consists in this, that the floor of the body is made of wood or metal and that the other parts of the body are pressed from artificial resin, preferably containing laminated paper as a filler.

In this way the manufacture of the vehicle is made considerably simpler, since the floor, which is of comparatively simple shape, can be made in one piece from solid material without using excessive pressure, and the other parts can be reliably secured thereto.

According to the invention the floor should be made of plywood or more particularly sheet of a metal of high strength, such materials make the manufacturing costs less without considerably increasing the weight of the vehicle construction.

The floor may advantageously be provided with longitudinal and transverse reinforcements, or, when made in sheet metal, may have pressed-out parts and the other parts of the body may, by similar means, be so strongly constructed and so firmly secured together and to the floor that a self-supporting body is obtained. In order completely to achieve the object of this self-supporting construction, according to the invention the pressed parts are united at the highly stressed places as for example, the door posts, by means of metal reinforcements and this makes the whole construction so rigid and resistant to torsion that, in spite of the light weight which is obtained, even vehicles with powerful engines can be constructed according to the self-supporting principle.

In order to ensure this rigid connection even for the comparatively thin artificial resin parts, the edges of these parts and other highly stressed places are reinforced by means of applied strips of the same material, which are united with the base material during the pressing operation. These places give a sufficiently strong hold for the ordinary connecting means, so that, even when the vehicle is greatly stressed, it is impossible for such connecting means to be turned out or loosened.

As a further valuable feature the floor according to the invention is covered with a protective layer of artificial resin; this layer gives the same valuable resistance to rain water and other detrimental influences, even when the floor is made very thin, so that the length of life of the body is in no way reduced, in spite of the use of two constructional materials.

A number of constructional examples of the invention are illustrated in the accompanying drawings.

Fig. 7 shows a self-supporting vehicle body in longitudinal section,

Fig. 8 is an elevation of the vehicle body partly in section,

Fig. 9 is a part section on the line IX—IX of Fig. 7,

Fig. 10 is a part section on the line X—X of Fig. 7,

Fig. 11 is a part section on the line XI—XI of Fig. 8,

Fig. 12 is a plan view corresponding to Fig. 10,

Fig. 13 is a part section of a further constructional form at the height of the section IX—IX in Fig. 7, Fig. 14 is a part section on the line XIV—XIV of Fig. 7, Fig. 15 is a part section on the line XV—XV of Fig. 7, Fig. 16 is a plan view corresponding to Fig. 14.

Figure 1:
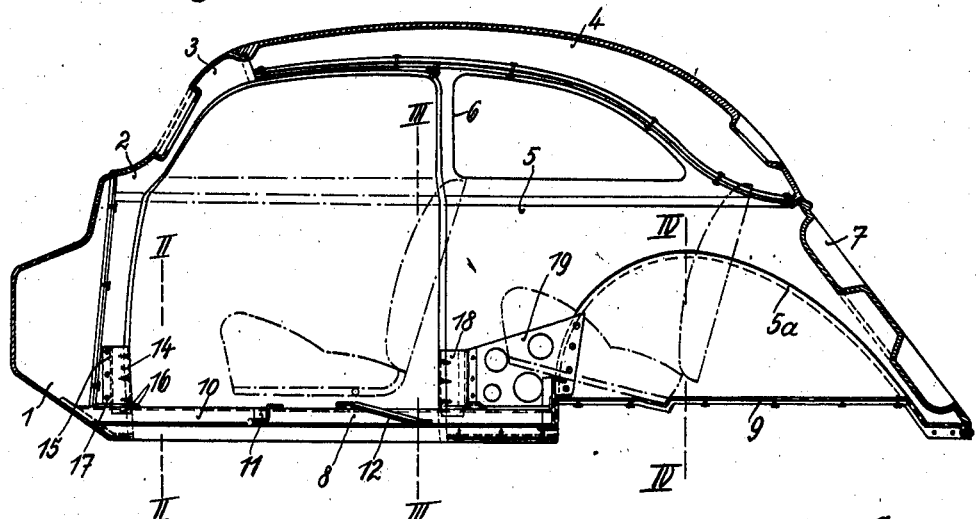
Fig. 1 shows the vehicle body in longitudinal section.
Figure 2:
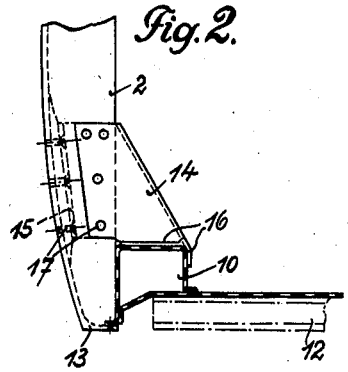
Fig. 2 is a part section on the line II—II of Fig. 1.
Figure 3:
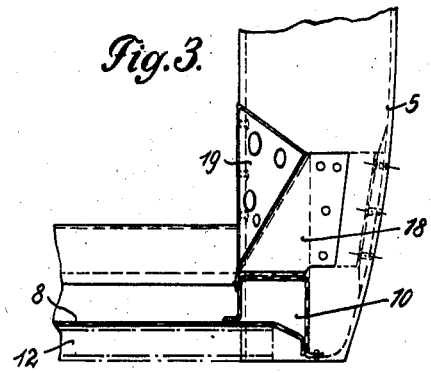
Fig. 3 is a part section on the line III—III of Fig. 1.
Figure 5:
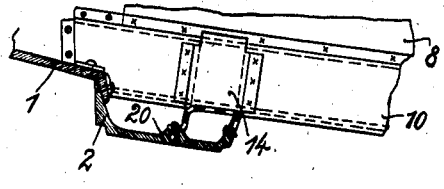
Fig. 5 is a plan corresponding to Fig. 2.
Figure 6:
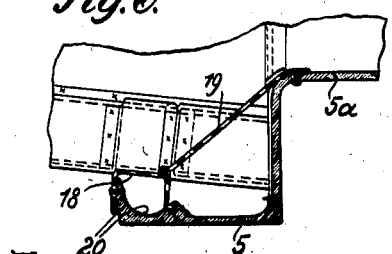
Fig. 6 is a plan corresponding to Fig. 3.
Figure 4:
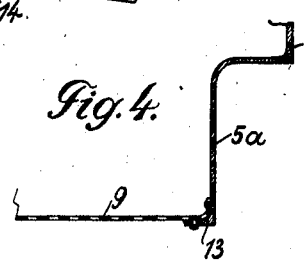
Fig. 4 is a part section on the line IV—IV of Fig. 1.

According to Figs. 1–6, the parts from which the new body is constructed are: two cowl side parts 1, a cowl upper part 2 with windscreen frame 3, a roof 4, two rear vehicle body parts 5 with wheel box 5a in one piece with frame for side windows 6, a vehicle rear part 7 and a floor 8. In the constructional examples the parts 1–7 consist of comparatively thin pressed artificial resin material, for example with laminated paper as filling material, and a notch shock strength of as nearly as possible 20–25 cmkg/cm². The floor 8 in this example is pressed from sheet metal and runs out rearwardly from the part adjoining the wheel box 5a in a flat part 9. In the front part it is reinforced longitudinally by lateral box-form reinforcements 10, and for transverse reinforcement profiles 11 and 12, which serve at the same time for supporting the seat rails, are applied. The rear profile is constructed to extend obliquely and serves at the same time as a foot rest for the rear seats.

For connecting them together and to the floor the parts 1-7 are provided with edges 13 and are connected to the edges of the adjoining parts and the flanges of the floor by means of ordinary screw bolts or similar connecting means. At highly stressed places, for example at the front door posts, separate metallic angle pieces 14 form the connecting means; these are made U-shaped and have flanges 15 and 16, by means of which they are connected with the artificial resin parts over a large area by means of screws 17. For the rear door posts similar connecting pieces 18 are provided, and moreover, the wheel box 5a is secured by means of riveted screws to the connecting piece 18 by means of a metal sheet 19. At the joints, especially between artificial resin and sheet metal, the edges of the artificial resin parts are reinforced by applied strips of the same material, as indicated at 20. These strips are united with the remaining material during the pressing operation in the manner of welding and are preferably so strong that ordinary steel screws can be used as connecting means.

In this constructional form plywood with inserted longitudinal bearers can also be used for the floor.

According to Figs. 7 and 8, the whole body construction is the same as in Figs. 1-7. The floor however, is made rigid and securely connected to the body, so that a self-supporting body is obtained. The laterally attached profiles 10a of the floor are carried forward so far that they can be used in suspending the engine and the front wheels. Transverse reinforcements 11a and 12a are likewise provided with correspondingly greater height and further transverse reinforcements 11c are applied on the floor or are secured underneath it at other highly stressed places for reinforcing it. For attaching the flat floor part 9 transverse reinforcements 21, 22 are provided, which reinforce the floor in this part in such a manner that an ordinary rubber springing arrangement 23 for the rear wheels can be fixed on the floor.

According to Fig. 9 the lateral reinforcements 10a are constructed as box-form bearers composed of individual sheet metal strips, while Figs. 10-12 and 14, 16 show U-sections 10b acting as longitudinal reinforcements. The under side of the floor is provided with an artificial resin layer 24 for protection against rain water. Fig. 11 shows a rubber section 25 between the door 6a and the longitudinal member 10b for sealing the artificial resin door 6a.

In Fig. 13, while the remaining construction is the same, the floor 8c and the box-form bearers 10c are composed of plywood plates, and these plates are held together by means of longitudinal reinforcements 26 in which ordinary wood screws 27 can be screwed for attaching the artificial resin edges. A box part 28 for accommodating the feet is in this case made of sheet metal; the plywood plate lying nearest to the road surface may be covered with an artificial resin layer or may be impregnated with artificial resin.

Figs. 14, 16 show a particularly rigid construction of the rear floor part and the side wheels and the flanges 21, which give good transverse reinforcement and to which the rear floor part 9 is attached.

In Fig. 15 the reinforcement edge 13 of the wheel box 5a follows the course of a pressed-out part 29 of the bottom part 9 provided for making possible the springing of the rear wheels, the edge of the pressing 5a being connected with the part 9.

What I claim is—

A vehicle body, more particularly for an automobile, comprising in combination a floor made of metal and other parts pressed from laminated paper impregnated with artificial resin with reinforcements at the points of connection with the floor, formed by uniting strips of the same material with the parts during the pressing operation.

REINHOLD ERHARD CONRAD SCHULZ.